United States Patent Office 2,900,261
Patented Aug. 18, 1959

2,900,261

PACKAGING FRESHLY CUT RED MEATS

James E. Snyder, Akron, and George W. Ferner, Cuyahoga Falls, Ohio, assignors to The Goodyear Tire & Rubber Company, Akron, Ohio, a corporation of Ohio No Drawing. Application July 16, 1956
Serial No. 597,892

8 Claims. (Cl. 99—174)

This invention relates to the packaging of freshly cut red meats in a rubber hydrochloride film which prolongs the life of the red color of the meat. The invention includes the package and the method of packaging.

The term "red meats" is used herein to refer to beef, lamb, pork and veal. The prolongation of the life of the red color of freshly cut red meats is most pronounced in packaged beef products. In pork, lamb and veal products packaged in transparent wrappers, the prolongation of the life of the red color is less pronounced, although there is myoglobin in all of these meats, and any red meat in which this material is in the reduced state which has a purple color and in which it has changed to the oxidized state which has a brownish or greenish color, is not acceptable to the housewife or other purchaser.

In the market where cuts of meat are displayed in transparent films, the housewife or other purchaser will avoid a cut of red meat which has discolored. Prolongation of the life of the red color is, therefore, of great importance.

According to this invention the freshly cut red meat is packaged in a rubber hydrochloride film with an ester plasticizer content of 25 to 40 parts, and contains at least 10 parts of a dialkyl adipate for each 100 parts of the rubber hydrochloride. The film may contain other plasticizer and other ingredients such as non-blocking agents, non-fogging agents, etc. Where the adipate ratio is under 25 parts per 100 parts of rubber hydrochloride, additional ester plasticizer or its equivalent is required to bring the total plasticizer content to 25 parts. It is surprising that the presence of the adipate in the film prolongs the period during which the red color of the freshly cut red meat stays red under ordinary storage conditions.

The alkyl groups of the adipate used in prolonging the life of the film may be the same or different. They may be straight chain or branched chain. The adipate must have a boiling point of at least 150° C. @ 4 mm. pressure. For example, diisobutyl adipate is not permanent; it is too volatile for commercial use. On the other hand, the adipate used must not crystallize in the rubber hydrochloride film at refrigerator temperatures, and, therefore, should have a melting point no higher than about 0° C. For these reasons the adipates employed in the rubber hydrochloride film of this invention are described herein as permanent liquid dialkyl adipates. The various examples illustrate the use of a wide range of adipates, but it is to be understood that the invention is not limited thereto but includes all of the permanent liquid dialkyl adipates.

A series of films was prepared for comparing the effectiveness of the different adipates. The same general formula was used in each, the only variant being the amount and type of plasticizer or plasticizers utilized. The basic formula was:

| | Parts |
|---|---|
| Rubber hydrochloride | 100 |
| Carbowax 1500 dilaurate | 1.5 |
| Santocel | 1.0 |

The carbowax ester was used to prevent fogging. The Santocel, a cellular silica product, was used to prevent the sheets of film from blocking when stacked on top of one another in a sufficiently high stack to exert an appreciable pressure upon the lower films of the stack. To a film composition having this basic formula, the following plasticizers and plasticizer combinations were added:

| | Parts |
|---|---|
| Formula No. 1: | |
| Di-2-ethylhexyl adipate | 10 |
| Dibutyl phthalate | 25 |
| Formula No. 2: | |
| Di-2-ethylhexyl adipate | 15 |
| 2-Ethylhexyl diphenyl phosphate | 20 |
| Formula No. 3: | |
| Dicapryl adipate | 15 |
| 2-Ethylhexyl diphenyl phosphate | 15 |
| Formula No. 4: | |
| Dihexyl adipate | 15 |
| 2-Ethylhexyl diphenyl phosphate | 15 |
| Formula No. 5: n-Octyl n-decyl adipate | 30 |
| Formula No. 6: | |
| n-Octyl n-decyl adipate | 15 |
| Di-2-ethylhexyl adipate | 15 |
| Formula No. 7: Diisodecyl adipate | 30 |
| Formula No. 8: Diisooctyl decyl adipate | 30 |
| Formula No. 9: | |
| Diisodecyl adipate | 15 |
| Diisooctyl adipate | 15 |
| Formula No. 10: | |
| Diisodecyl adipate | 15 |
| Di-2-ethylhexyl adipate | 15 |
| Formula No. 11: Di-2-ethylhexyl adipate | 30 |
| Formula No. 12: | |
| Di-2-ethylhexyl adipate | 16 |
| Di-isooctyldecyl adipate | 15 |
| Formula No. 13: | |
| Di(3,5,5-trimethylhexyl) adipate | 15 |
| 2-Ethylhexyl diphenyl phosphate | 15 |
| Formula No. 14: | |
| Diisooctyl adipate | 15 |
| 2-Ethylhexyl diphenyl phosphate | 15 |
| Formula No. 15: | |
| Dinonyl adipate | 15 |
| Dibutyl phthalate | 15 |

The various compositions were cast into films about 0.0008" thick and the films were tested to determine their effectiveness in preserving red meat color compared with a commercial rubber hydrochloride meat film of formula:

| | Parts |
|---|---|
| Rubber hydrochloride | 100 |
| Dibutyl phthalate | 15 |
| 2-ethylhexyldiphenyl phosphate | 15 |
| Carbowax 1500 dilaurate | 1.5 |
| Santocel | 1.0 |

The results are given in the following table, in which the figures are the average of at least four ratings and represent the improvement over the commercial film. Zero (0) indicates no difference compared with the control; 0.10 is a slight but definite difference; and 0.30 is a very substantial difference. Each film was tested against two different beef product. The figures in the first column of results refer to the comparison of the films on ground lean beef. The figures in the second column refer to a comparison on a low grade of beef which was stored and shipped frozen and then packaged after thawing and grinding.

Table

| Formula No. | Ground Lean Beef | Ground Commercial Beef |
| --- | --- | --- |
| 1 | 0.35 | 0.35 |
| 2 | 0.30 | 0.40 |
| 3 | 0.20 | 0.15 |
| 4 | 0.15 | 0.15 |
| 5 | 0.35 | 0.35 |
| 6 | 0.40 | 0.40 |
| 7 | 0.20 | 0.15 |
| 8 | 0.25 | 0.20 |
| 9 | 0.40 | 0.10 |
| 10 | 0.25 | 0.00 |
| 11 | 0.30 | 0.20 |
| 12 | 0.20 | 0.10 |
| 13 | 0.15 | 0.10 |
| 14 | 0.20 | 0.10 |
| 15 | 0.15 | 0.20 |

The above tests show that the various dialkyl adipates, alone and admixed with other plasticizers, have a very appreciable effect in prolonging the life of the red color in red meats.

A careful examination of the films and of the packaged meats shows that the films are in every respect satisfactory packaging materials for red meats. The meats are preferably enclosed in a single ply of the film about 0.0003 to 0.0015 inch thick, with the edges of the film heat sealed to one another.

The invention is defined in the claims which follow.

What we claim is:

1. Red meat packaged in rubber hydrochloride film containing 25 to 40 parts of ester plasticizer per 100 parts of rubber hydrochloride, at least 10 parts of said plasticizer being a permanent liquid dialkyl adipate whereby the life of the red color of the meat is prolonged, said film being 0.0003 to .0015 inch thick.

2. The package of claim 1 in which the film contains at least 10 parts of di-2-ethylhexyl adipate.

3. The package of claim 1 in which the plasticizer content of the film consists of 10 parts of di-2-ethylhexyl adipate and 25 parts of dibutyl phthalate.

4. The package of claim 1 in which the plasticizer content of the film consists of 15 parts of di-2-ethylhexyl adipate and 20 parts of 2-ethylhexyl diphenyl phosphate.

5. The method of preserving the red color of red meat which comprises packaging red meat in rubber hydrochloride film which contains 25 to 40 parts of ester plasticizer per 100 parts of rubber hydrochloride, at least 10 parts of said plasticizer being a permanent liquid dialkyl adipate whereby the life of the red color of the meat is prolonged, said film being 0.0003 to .0015 inch thick.

6. The method of claim 5, in which the film contains at least 10 parts of di-2-ethylhexyl adipate.

7. The method of claim 5, in which the plasticizer content of the film consists of 10 parts of di-2-ethylhexyl adipate and 25 parts of dibutyl phthalate.

8. The method of claim 5, in which the plasticizer content of the film consists of 15 parts of di-2-ethylhexyl adipate and 20 parts of 2-ethylhexyl diphenyl phosphate.

References Cited in the file of this patent

UNITED STATES PATENTS

| | | |
| --- | --- | --- |
| 2,349,036 | Ferner | May 16, 1944 |
| 2,772,172 | Carson | Nov. 27, 1956 |
| 2,782,140 | Vaughan | Feb. 19, 1957 |